United States Patent
Edmonds et al.

(10) Patent No.: US 12,459,709 B1
(45) Date of Patent: Nov. 4, 2025

(54) PET FOOD CONTAINER

(71) Applicant: Edmonds Outdoors, LLC, La Vergne, TN (US)

(72) Inventors: Addison Edmonds, Nashville, TN (US); Gene Andrew Sparks, Nashville, TN (US)

(73) Assignee: Edmonds Outdoors, LLC, La Vergne, TN (US)

( * ) Notice: Subject to any disclaimer, the term of this patent is extended or adjusted under 35 U.S.C. 154(b) by 0 days.

(21) Appl. No.: 17/448,953

(22) Filed: Sep. 27, 2021

Related U.S. Application Data

(63) Continuation-in-part of application No. 29/752,270, filed on Sep. 25, 2020.

(60) Provisional application No. 63/111,278, filed on Nov. 9, 2020, provisional application No. 63/083,835, filed on Sep. 25, 2020.

(51) Int. Cl.

| | |
|---|---|
| *B65D 43/16* | (2006.01) |
| *B65D 25/28* | (2006.01) |
| *B65D 25/38* | (2006.01) |
| *B65D 45/20* | (2006.01) |

(52) U.S. Cl.
CPC ....... *B65D 43/164* (2013.01); *B65D 25/2894* (2013.01); *B65D 25/38* (2013.01); *B65D 45/20* (2013.01); *B65D 2251/1058* (2013.01)

(58) Field of Classification Search
CPC .. B65D 43/22; B65D 43/164; B65D 25/2894; B65D 25/38; B65D 45/20; B65D 2251/1058
See application file for complete search history.

(56) References Cited

U.S. PATENT DOCUMENTS

| 4,951,983 | A  * | 8/1990  | Scott ...................... E05C 19/14 292/113 |
| 5,226,574 | A  * | 7/1993  | Durinzi, Jr. ........ B65D 25/2897 239/377 |
| 5,310,073 | A  * | 5/1994  | Johannsson ............ A22B 7/008 220/592.2 |
| 7,357,271 | B2 * | 4/2008  | Hase .................. B65D 81/3818 220/592.2 |
| 10,221,011 | B2 * | 3/2019  | Stone ........................ B65F 1/14 |
| 2014/0014669 | A1 * | 1/2014  | Smith ................... F25D 23/026 220/592.01 |
| 2017/0305638 | A1 * | 10/2017 | Sonntag ............. B65D 25/2882 |

* cited by examiner

*Primary Examiner* — Andrew T Kirsch
(74) *Attorney, Agent, or Firm* — Holland & Knight LLP; Matthew C. Cox

(57) ABSTRACT

A pet food container apparatus may include a container body that may define an interior space for storing the pet food, a lid that may be pivotally attached to the container body at a lid hinge, an opening defined in the container body that may be configured for accessing the interior space of the container body, and a lid rim that may protrude upwardly from the container body and may surround the opening. The apparatus may include a gasket disposed on the lid opposite the lid rim. The apparatus may include a fastener. The fastener may include a latch disposed on the lid. The fastener may include a latch base disposed on the container body and may be aligned with the latch. The lid rim may engage the gasket in a continuous ring-shaped seal when the latch engages the latch base and the lid is in a closed position.

19 Claims, 22 Drawing Sheets

PET FOOD CONTAINER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional application and claims priority to U.S. Provisional Patent Application No. 63/083,835, filed Sep. 25, 2020, entitled PET FOOD CONTAINER; and claims priority to U.S. Provisional Patent Application No. 63/111,278, filed Nov. 9, 2020, entitled PET FOOD CONTAINER; and is a continuation-in-part of U.S. patent application Ser. No. 29/752,270, filed Sep. 25, 2020, entitled PET FOOD CONTAINER; all of which are hereby incorporated by reference in their entireties.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to containers for pet food and more particularly to pet food containers for storing dry dog food.

Conventional pet food containers such as containers for storing dry dog food are difficult to handle when filling or pouring food. Additionally, such containers are difficult to reach into with a dog food bowl to fill the bowl. Also, conventional dog food containers are prone to leaking and do not provide an adequate seal to keep bugs and moisture out of the container. One problem associated with conventional pet food containers is that the contents may be exposed to moisture or pests and may become contaminated, resulting in waste. Also, conventional pet food containers are not adequately sealed and configured to be stored outside, such as in the back of a pickup truck or in an outside dog kennel.

What is needed then are improvements in pet food containers.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a pet food container apparatus. The apparatus may include a container body that may define an interior space for storing the pet food. The apparatus may include a lid that may be pivotally attached to the container body at a lid hinge. The apparatus may include an opening defined in the container body that may be configured for accessing the interior space of the container body. The apparatus may include a lid rim that may protrude upwardly from the container body and may surround the opening. The apparatus may include a gasket disposed on the lid opposite the lid rim. The apparatus may include a fastener. The fastener may include a latch disposed on the lid. The fastener may include a latch base disposed on the container body and may be aligned with the latch. The lid rim may engage the gasket in a continuous ring-shaped seal when the latch engages the latch base and the lid is in a closed position.

Another aspect of the disclosure is another pet food container apparatus. The apparatus may include a container body that may define an interior space for storing the pet food. The apparatus may include a lid that may be pivotally attached to the container body at a lid hinge. The apparatus may include an opening that may be defined in the container body configured for accessing the interior space of the container body. The apparatus may include a lid rim that may protrude upwardly from the container body and surround the opening. The apparatus may include a fastener. The fastener may include a latch disposed on the lid. The fastener may include a latch base disposed on the container body and aligned with the latch. The lid rim may engage an underside of the lid in a continuous ring-shaped seal when the latch engages the latch base and the lid is in a closed position.

One aspect of the disclosure is another pet food container apparatus. The apparatus may include a container body that may define an interior space for storing the pet food. The apparatus may include one or more feet that may be disposed on a bottom of the container body. The apparatus may include a lid that may be pivotally attached to the container body at a lid hinge. The apparatus may include an opening that may be defined in the container body and configured for accessing the interior space of the container body. The apparatus may include a lid rim that may protrude upwardly from the container body and surround the opening. The apparatus may include a gasket that may be disposed on the lid opposite the lid rim. The apparatus may include a fastener. The fastener may include a latch disposed on the lid. The fastener may include a latch base that may be disposed on the container body and aligned with the latch. The apparatus may include a lock pin that may be selectively removable from the latch and the latch base. The lid rim may engage the gasket in a continuous ring-shaped seal when the latch engages the latch base and the lid is in a closed position.

Numerous other objects, advantages and features of the present disclosure will be readily apparent to those of skill in the art upon a review of the following drawings and description of a preferred embodiment.

DETAILED DESCRIPTION

Figure 1:
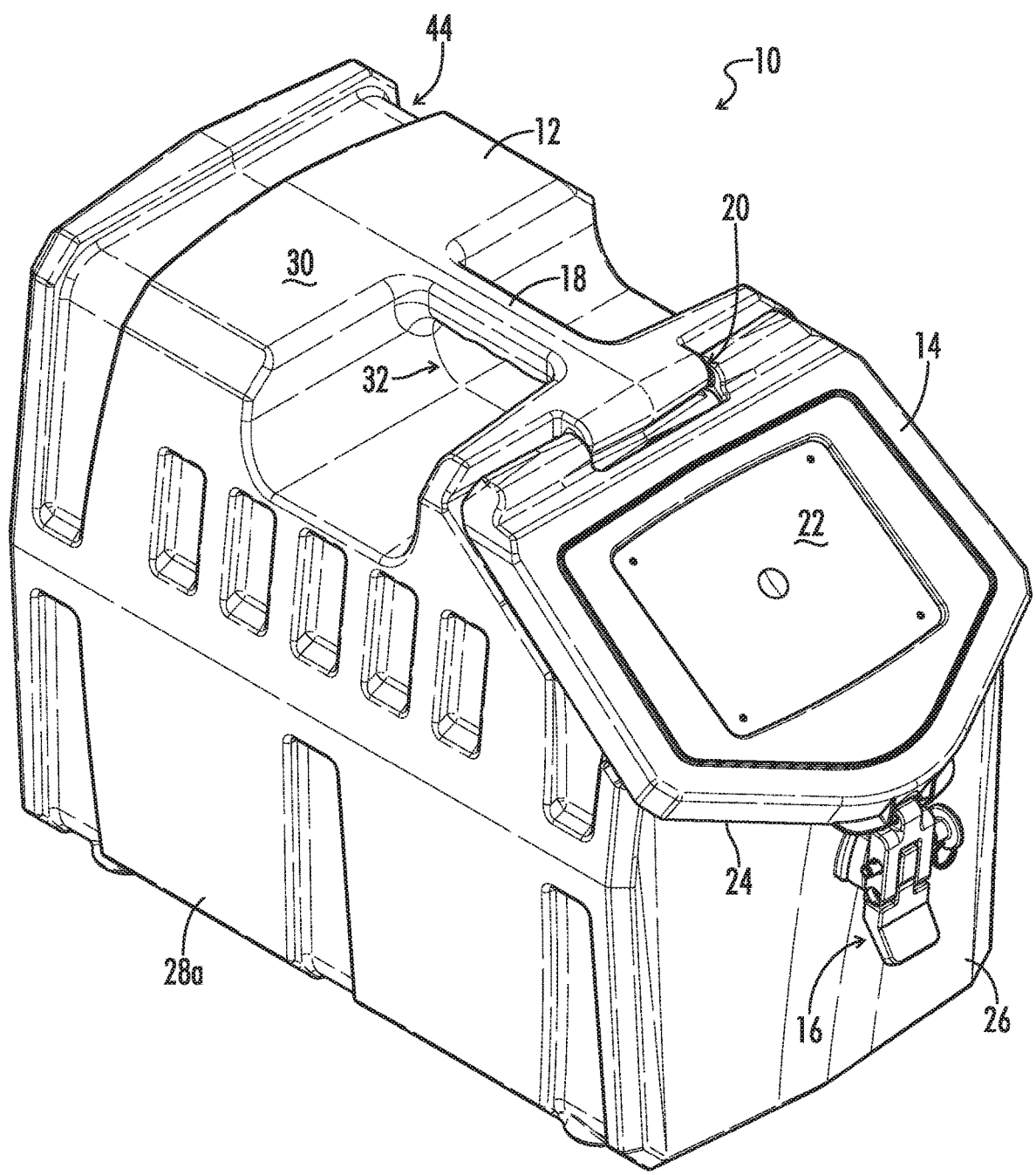
FIG. 1 is a front perspective view illustrating one embodiment of a pet food container.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

"Pet food," as disclosed herein, is only meant to be illustrative of the numerous other things that could be stored in the container. While this disclosure relates to and speaks of containers for pet food, it should be understood and emphasized that "pet food" is only one of a number of different things that could be stored in such a container. For example, it would be obvious to one ordinarily skilled in the art that the container disclosed herein is also particularly suitable and useful for storing objects like other foods, grains, waste, fertilizers, grass seeds, and other miscellaneous solids and liquids.

FIGS. 1-8 illustrate embodiments of a pet food container 10. As seen in FIG. 1, the pet food container 10 may include a container body 12. The pet food container 10 may include a lid 14.

Figure 5:
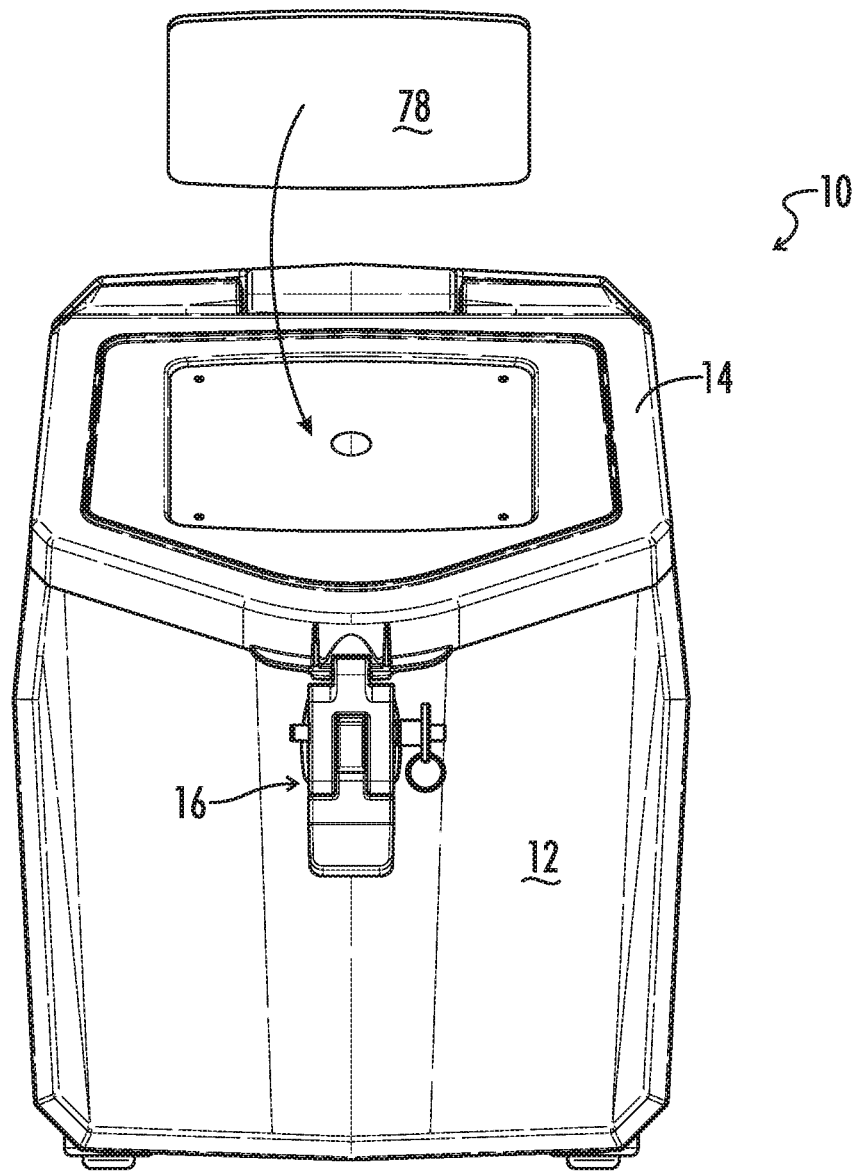
FIG. 5 is a front view illustrating one embodiment of a pet food container.
Figure 6:
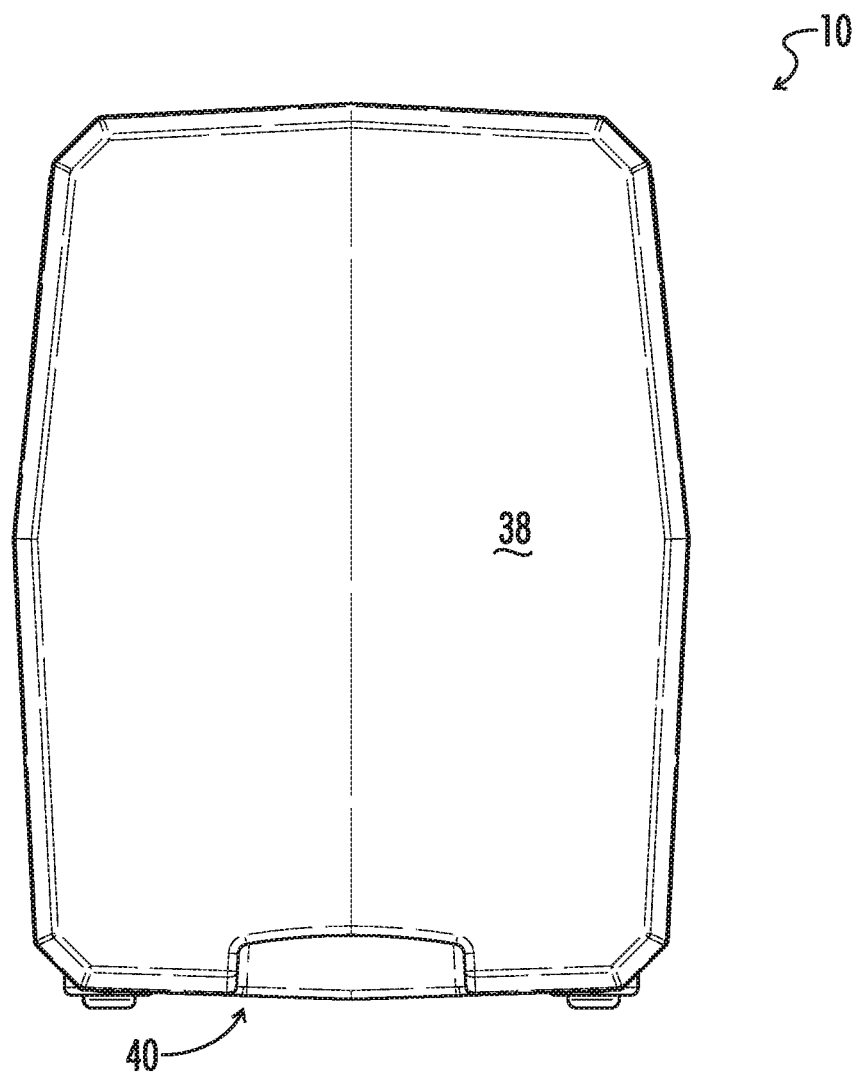
FIG. 6 is a back view illustrating one embodiment of a pet food container.
Figure 7:
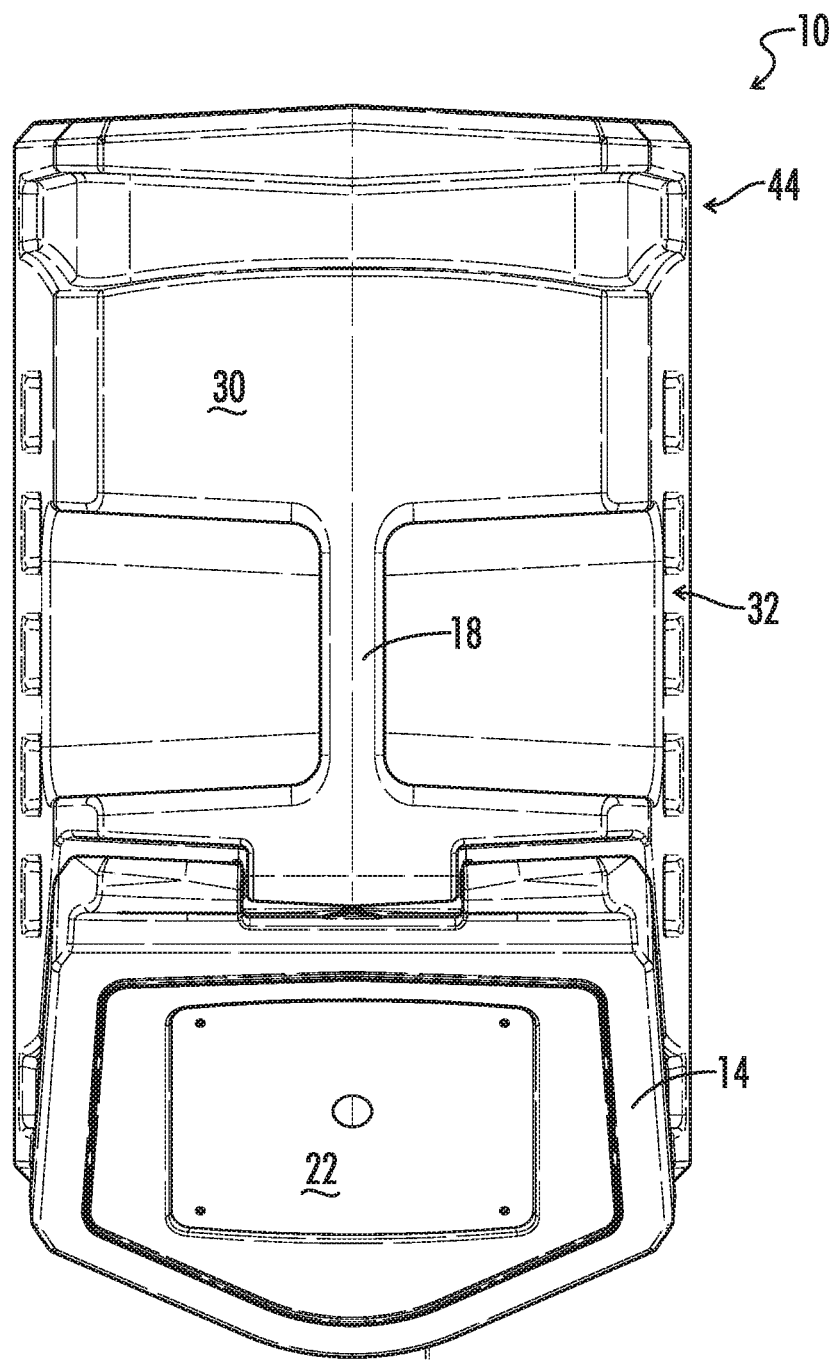
FIG. 7 is a top-down view illustrating one embodiment of a pet food container.
Figure 8:
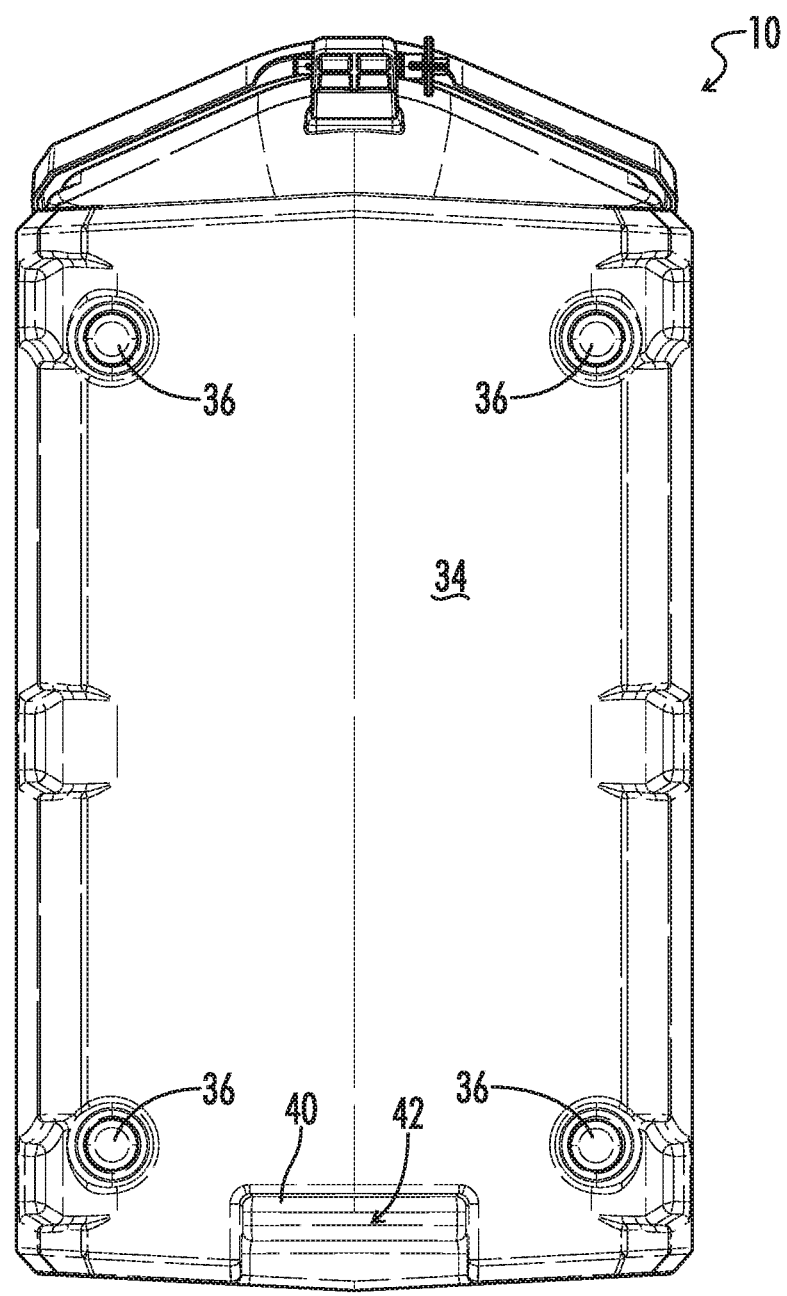
FIG. 8 is a bottom-up view illustrating one embodiment of a pet food container.
Figure 9:
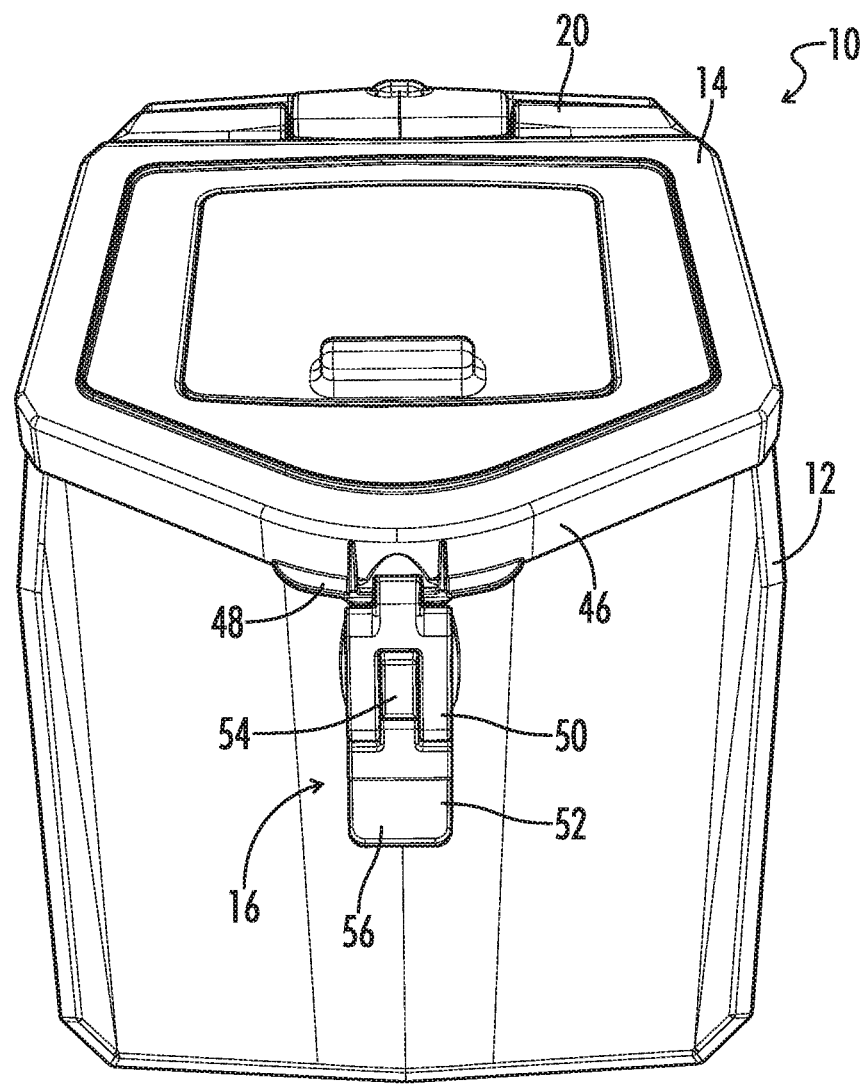
FIG. 9 is a front view illustrating one embodiment of a pet food container.
Figure 10:
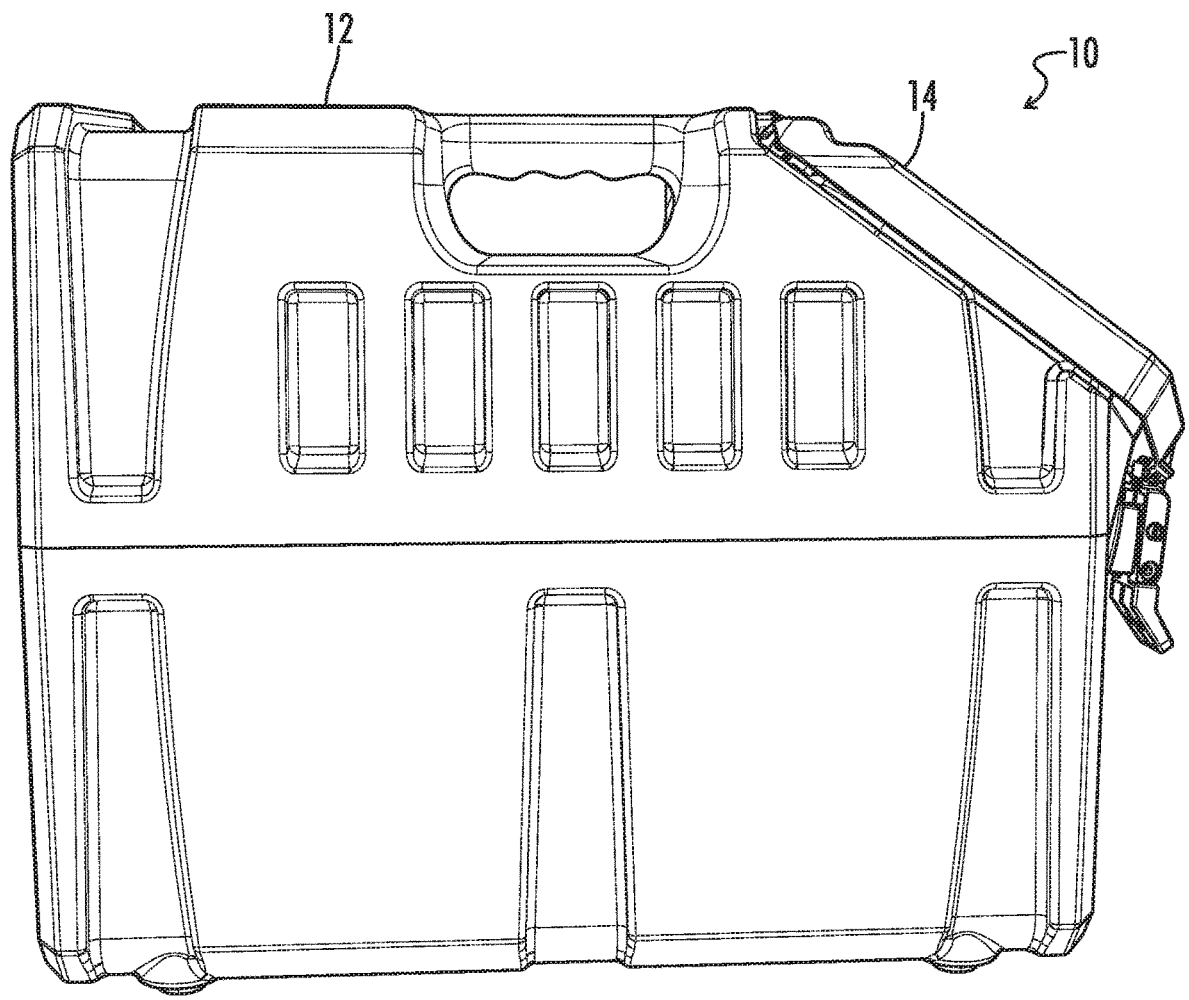
FIG. 10 is a right side view illustrating one embodiment of a pet food container.
Figure 11:
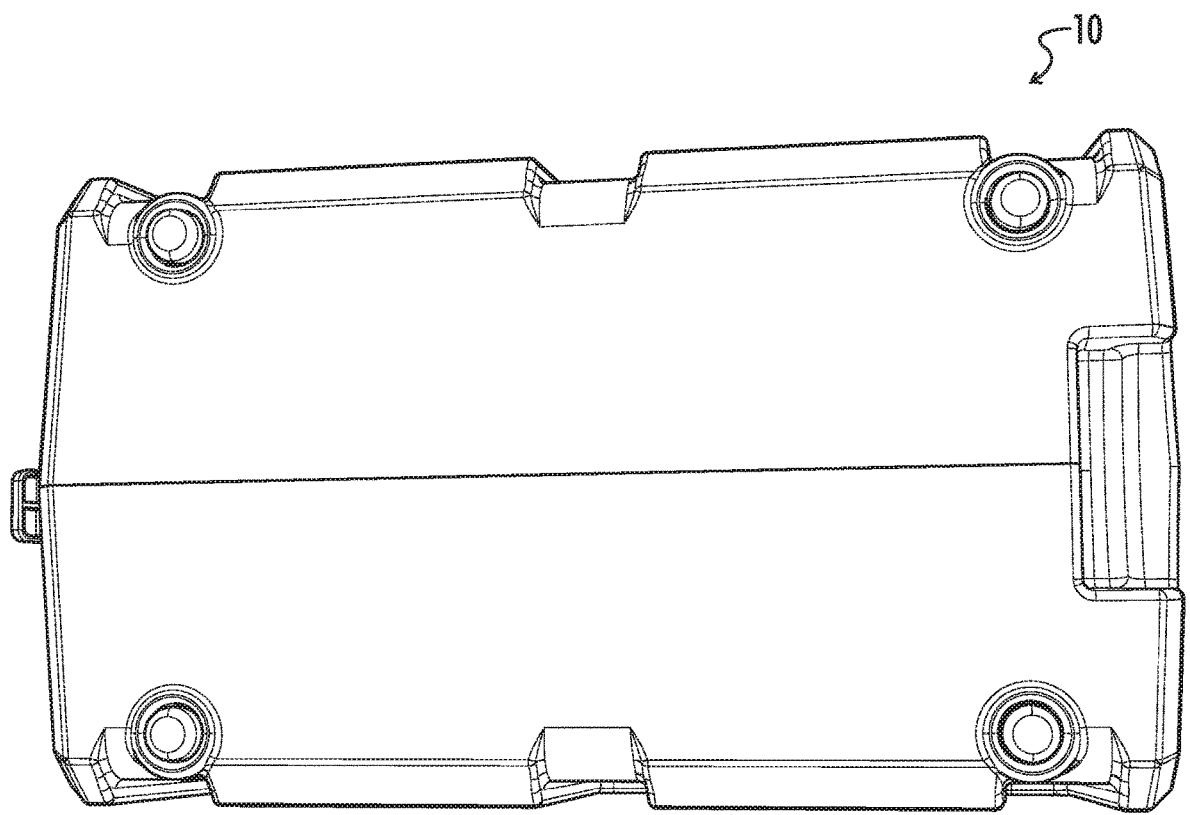
FIG. 11 is a bottom-up perspective view illustrating one embodiment of a pet food container.
Figure 12:
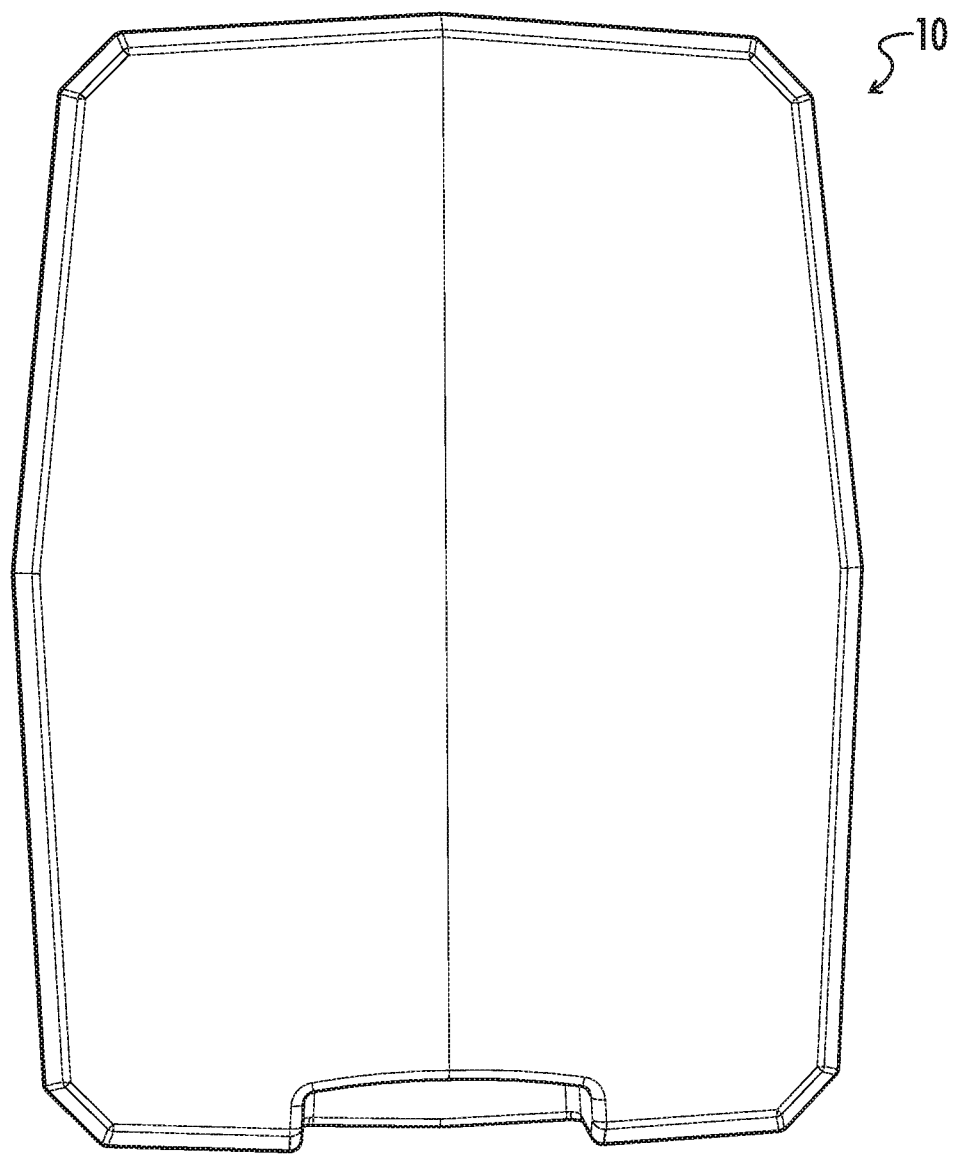
FIG. 12 is a back view illustrating one embodiment of a pet food container.

In one embodiment, the lid 14 may be pivotally attached to the container body 12. The lid 14 may pivotally attach to the container body 12 at a lid hinge 20. In some embodiments, the lid hinge 20 may include a friction hinge configured to hold the lid 14 in place when partially opened relative to the body 12. The lid 14 may include a name plate recess 22. A name plate 78 (for example, as illustrated in FIG. 5) may be mounted in the name plate recess 22 in some embodiments. The name plate 78 may be secured in the name plate recess 22 of the lid 14 using one or more fasteners, adhesive or any other suitable attachment such as a friction or interference fit.

In some embodiments, the lid 14 may include a lid edge 24. The lid edge 24 may extend downwardly around an outer perimeter of the lid 14. The lid edge 24 may form a barrier that may prevent dust, debris, insects, or other material from entering the space between the lid 14 and the container body 12. The lid edge 24 may provide rigidity to the lid 14 to provide a stable and secure seal between the lid 14 and the container body 12. In one or more embodiments, the lid 14 may be secured in place relative to the container body 12 using a fastener 16. The fastener 16 may include any suitable fastening device for selectively securing the lid 14 in place against the container body 12.

Figure 2:
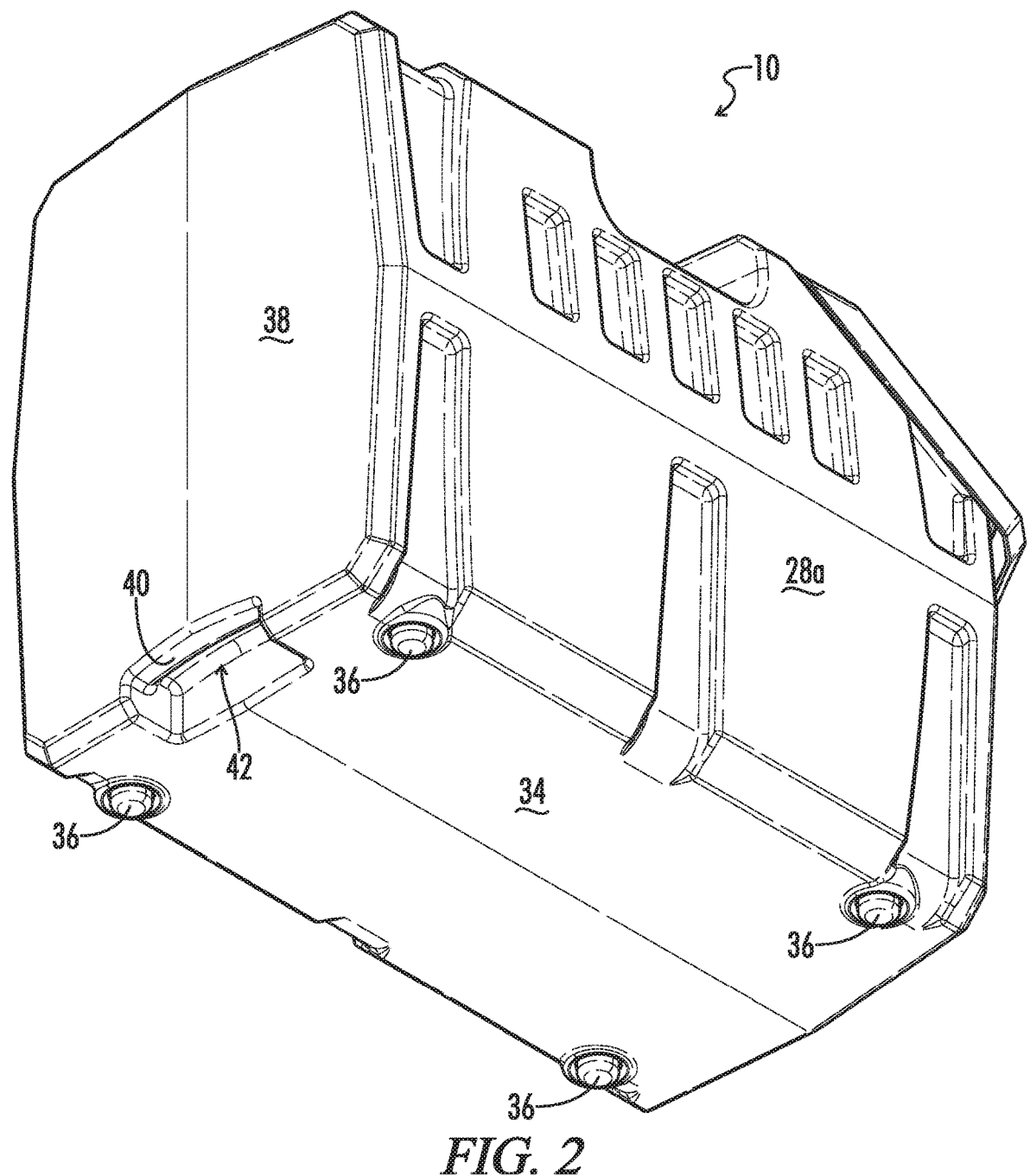
FIG. 2 is a back perspective view illustrating one embodiment of a pet food container.
Figure 3:
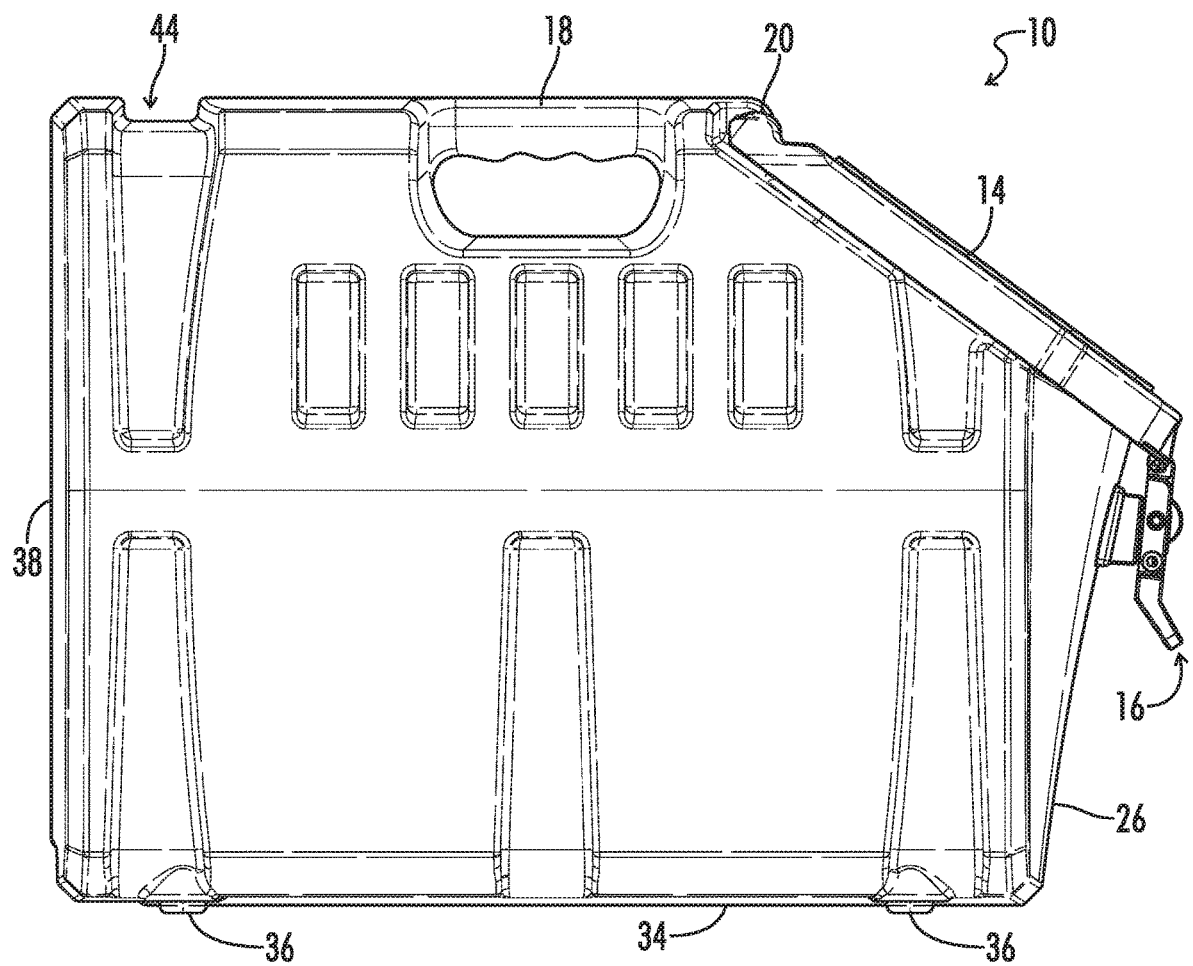
FIG. 3 is a right side view illustrating one embodiment of a pet food container.
Figure 4:
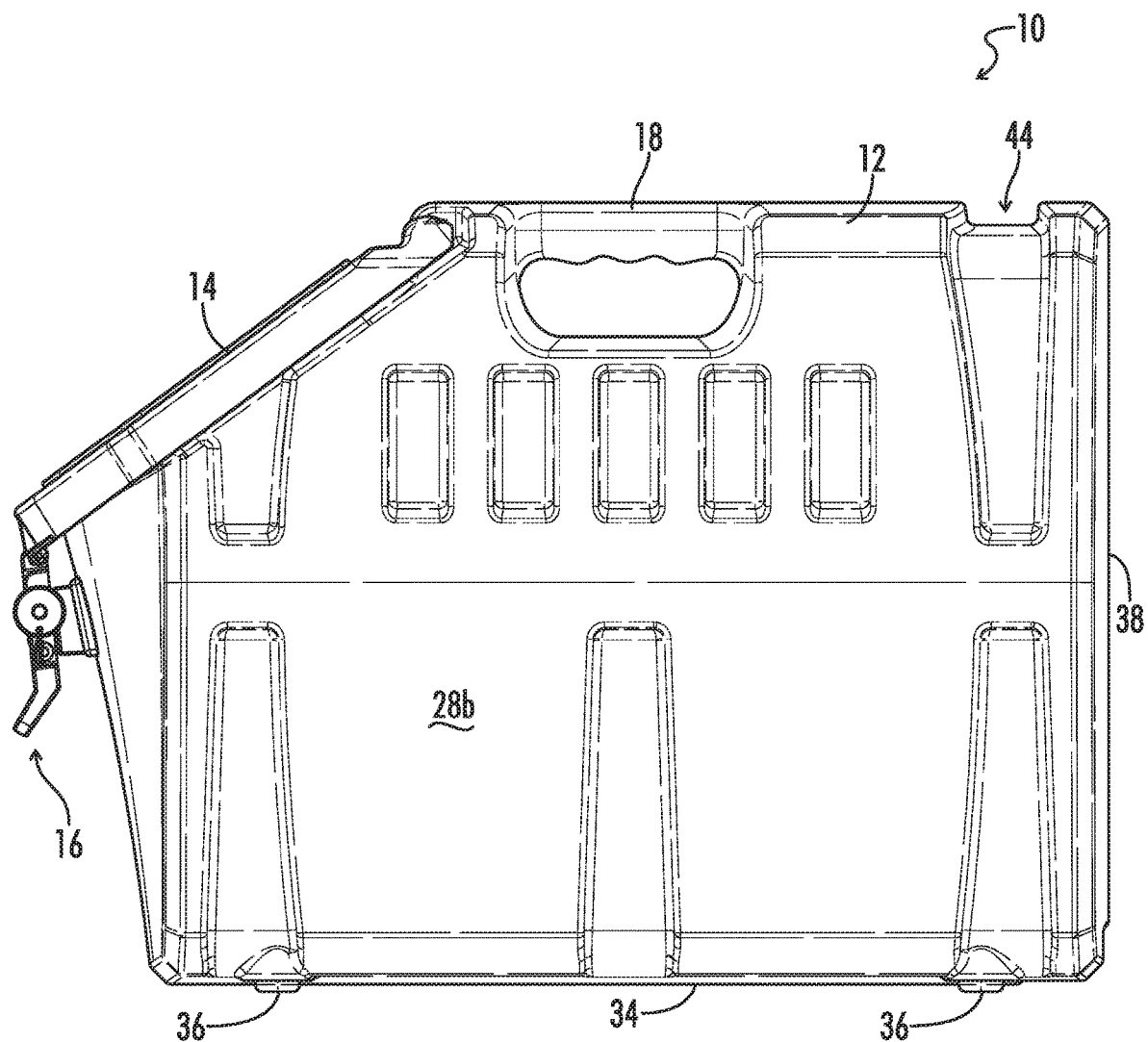
FIG. 4 is a left side view illustrating one embodiment of a pet food container.

In one embodiment, the container body 12 may include a front side 26, a right side 28a, a left side 28b (as seen in FIG. 4), a back side 38 (as seen in FIG. 2), or a bottom 34. The container body 12 may define an interior space. The interior space may be configured for storing pet food. In certain embodiments, the pet food may include dry dog food. In some embodiments, the container body 12 may be dimensioned to accommodate a full bag of dog food. For example, in some embodiments, the container body 12 may be shaped and dimensioned to receive and store about 30 pounds (approx. 13.6 kilograms) of dog food so that an entire commercial bag of dog food may be stored at once and the bag discarded, which may allow the entire contents of the bag to be stored so that no residual amounts are stored outside of the container 10.

In some embodiments, a handle 18 may be integrally molded in the top 30 of the container body 12. In one embodiment, the handle 18 may be located at a center of the top 30 of the container body 12, as is shown in FIG. 1. The handle 18 may provide a location for a user to grasp the container 10, to lift the container 10, or to pour food or water out of the container 10. In some embodiments, the container body 12 may be made of an injection molded or roto-molded polymer material, and the handle 18 may be integrally molded in the container body 12 as a single piece. A handle recess 32 may be defined between the handle 18 and the container body 12. Additionally or alternatively, a strap recess 44 may be integrally formed in the top 30 on the container body 12 in some embodiments. The strap recess 44 may provide a recess or indentation on the top 30 of the container body 12. The recess or indentation of the strap recess 44 may provide a place to secure a strap or cable across the top 30 of the container body 12 to secure the container body 12 in place, such as in the back of a vehicle or on a storage rack.

The bottom 34 of the container body 12 may include a substantially flat surface. In some embodiments, a plurality of feet 36 may protrude from the bottom 34. The feet 36 may provide a standoff height for the bottom 34 above the ground or a floor on which the container 10 may rest. As such, the feet 36 may prevent the bottom 34 from coming into direct contact with the floor, which may prevent moisture or pests on the ground from directly contacting the bottom 34. One or more of the feet 36 may include a rubber or a non-slip material in some embodiments. A foot 36 may be threaded into a threaded socket formed in the bottom 34 in some embodiments. A foot 36 may be removable so it may be taken off or replaced.

As depicted in FIG. 2, in one embodiment, a pour handle 40 may be defined on the container body 12. The pour handle 40 may be defined on the lower back edge of container body 12 at the intersection of the back side 38 and the bottom 34. The pour handle 40 may include a pour handle recess 42 that may receive a portion of a user's hand. A user may grasp the lower back edge to pour the contents of the container 10 out. Thus, during use, a user may simultaneously grasp the handle 18 and the pour handle 40 to pour contents out of the container 10.

FIGS. 9-17 depict further embodiments of a pet food container 10. The pet food container 10 may include a fastener 16 positioned on the front of the container 10. The fastener 16 may include a portion disposed on the lid 14 and a portion disposed on the container body 12. The portion of the fastener 16 disposed on the lid 14 may include a latch 49. The portion of the fastener 16 disposed on the container body 12 may include a latch base 54. In some embodiments, the latch 49 may align with the latch base 54.

In one embodiment, the latch 49 may include a latch link 50. The latch 49 may include a latch clamp 52. The latch 49 may include a latch tab 56. In one embodiment, the latch base 54 may be disposed on the front side 26. The latch base 54 may protrude outwardly from the front side 26 of the container 10. In some embodiments, the latch base 54 may be rigidly secured to the container body 12 using one or more fasteners. In alternative embodiments, the latch base 54 may be integrally formed on the container body 12 as a single, integrally molded part.

In some embodiments, the lid 14 may include a latch side 46 with a latch mount 48 disposed on the latch side 46. The latch 49 may include a latch link 50. The latch link 50 may be pivotally attached to the lid 14 or the latch mount 48 at one end. At the opposite end of the latch link 50, a latch clamp 52 may be pivotally attached. The latch clamp 52 may include a latch tab 56 that a user may grasp to open or close the fastener 16. The latch tab 56 may protrude away from the container body 12 when the lid 14 is in a closed position.

During use, the lid 14 may pivot relative to the container body 12 along the lid hinge 20. When the lid 14 is closed, a user may operate the fastener 16 to secure the lid 14 in a closed position. When the lid 14 is closed and latched, an air-tight and water-tight seal may be formed between the lid 14 and the container body 12. This seal may prevent moisture, debris, or pests from entering the interior of the container 10 and accessing the dog food stored therein.

In some embodiments, the fastener 16 may be locked in the closed position using a lock pin 58. The lock pin 58 may be selectively removable from the fastener 16, the latch 49, or the latch base 54. By locking the fastener 16 closed, the fastener 16 may not be inadvertently opened by a dog or a user. The lock pin 58 may include an elongated rod that may slide into a corresponding latch pin socket 66 defined through the latch link 50. The lock pin 58 in some embodiments may include a retainer 64 that may be selectively released using a lock pin button 60. The lock pin button 60 may be disposed on a head 61 of the lock pin 58. When the lock pin button 60 is depressed, the retainer 64 may be withdrawn and the lock pin 58 may be inserted into latch pin socket 66. Following insertion, the lock pin button 60 may be released, thereby allowing the retainer 64 to spring back to a released position and secure the lock pin 58 securely in the latch pin socket 66. The fastener 16 may be operated with or without the lock pin 58. Other suitable embodiments of a lock for the fastener 16 may be used to secure the fastener 16 in a closed position to prevent inadvertent opening of the fastener 16 by a user or a pet.

In one or more embodiments, when the lock pin 58 is inserted into the latch pin socket 66, the lock pin 58 may extend through both the latch pin socket 66 and a corresponding lock socket 72. The lock socket 72 may be defined on the latch base 54. The lock pin 58 may be selectively disposable in the latch pin socket 66 or the lock socket 72 when the lid 14 is in the closed position. The lock pin 58 being inserted into both the lock pin socket 66 and the lock socket 72 may prevent the fastener 16 from being opened.

In some embodiments, the latch 49 may include a latch clamp pivot 62. The latch clamp pivot 62 may be disposed between the latch link 50 and the latch clamp 52, which may make the latch clamp 52 pivotable relative to the latch link 50. The latch clamp 52 may include, on its upper edge, a latch cam 68. The latch cam 68 may engage the latch base 54 when the lid 14 is in a closed position. The latch cam 68 may protrude past the latch clamp pivot 62. The latch cam 68 may be shaped to be received in a corresponding latch base recess 70. The latch base recess 70 may be defined on an underside of the latch base 54. When the fastener 16 is closed, the latch cam 68 may be selectively disposed in the latch base recess 70 or may otherwise engage the latch base 54. A latch base flange 74 may protrude downwardly from the front edge of latch base 54 to prevent the latch cam 68 from sliding out of the latch base recess 70 when the fastener 16 is in the closed position. In some embodiments, the latch base recess 70 may be defined by the latch base flange 74 or another portion of the latch base 54.

The latch cam 68 may operate as a cam when the latch tab 56 is pressed toward the front of the container body 12. In some embodiments, the camming action of the latch cam 68 may provide adequate downward pressure to engage a lid rim 82 fully with a gasket 88. The lid rim 82 may protrude upwardly from the container body 12 and surround an opening 80. The gasket 88 may be positioned on the inside 76 of the lid 14. The gasket 88 may be disposed on the lid 14 opposite the lid rim 82. The lid rim 82 may form a continuous loop around the opening 80 of the container body 12. The opening 80 may be defined in the container body 12. The lid rim 82 may be shaped in the form of an upright wall that may extend toward the lid 14. When the lid 14 is closed, the lid rim 82 may immediately engage the underside of lid 14, and more specifically, may engage the gasket 88 to form a seal. In some embodiments, the lid rim 82 may engage with an underside of the lid 14 when the latch 49 engages the latch base 54 and the lid 14 is in a closed position. The lid rim 82 and the lid 14 may engage in a continuous ring-shaped seal. The lid edge 24 may be selectively disposed around the lid rim 82 when the lid 14 is in a closed position.

In one embodiment, the lid rim 82 may engage the gasket 88 when the latch 49 engages the latch base 54 and the lid 14 is in a closed position. The gasket 88 may include a continuous ring-shaped gasket disposed around the perimeter of the inside 76 of the lid 14. The gasket 88 may include any suitable material to provide a seal between the lid 14 and the lid rim 82 on the container body 12. In some embodiments, the gasket 88 may be held in place using an adhesive. In other embodiments, the gasket 88 may be held in place on the lid 14 using an interference fit. The gasket 88 may be overmolded directly onto the lid 14 in other embodiments. The gasket 88 may include a silicone or rubber material in some embodiments. The gasket 88 can have any suitable thickness to provide a seal between the lid rim 82 and the lid 14. In some embodiments, the gasket 88 may include a thickness of between about 1 millimeter and about 10 millimeters. The gasket 88 may be compressible, in some embodiments, to provide a small distance of travel for the lid 14 when the downward pressure associated with the camming action of latch cam 68 is applied. The gasket 88 may also be resilient, and may return to its original, uncompressed shape (or near its original, uncompressed shape) in some embodiments when the fastener 16 is released.

Figure 16:
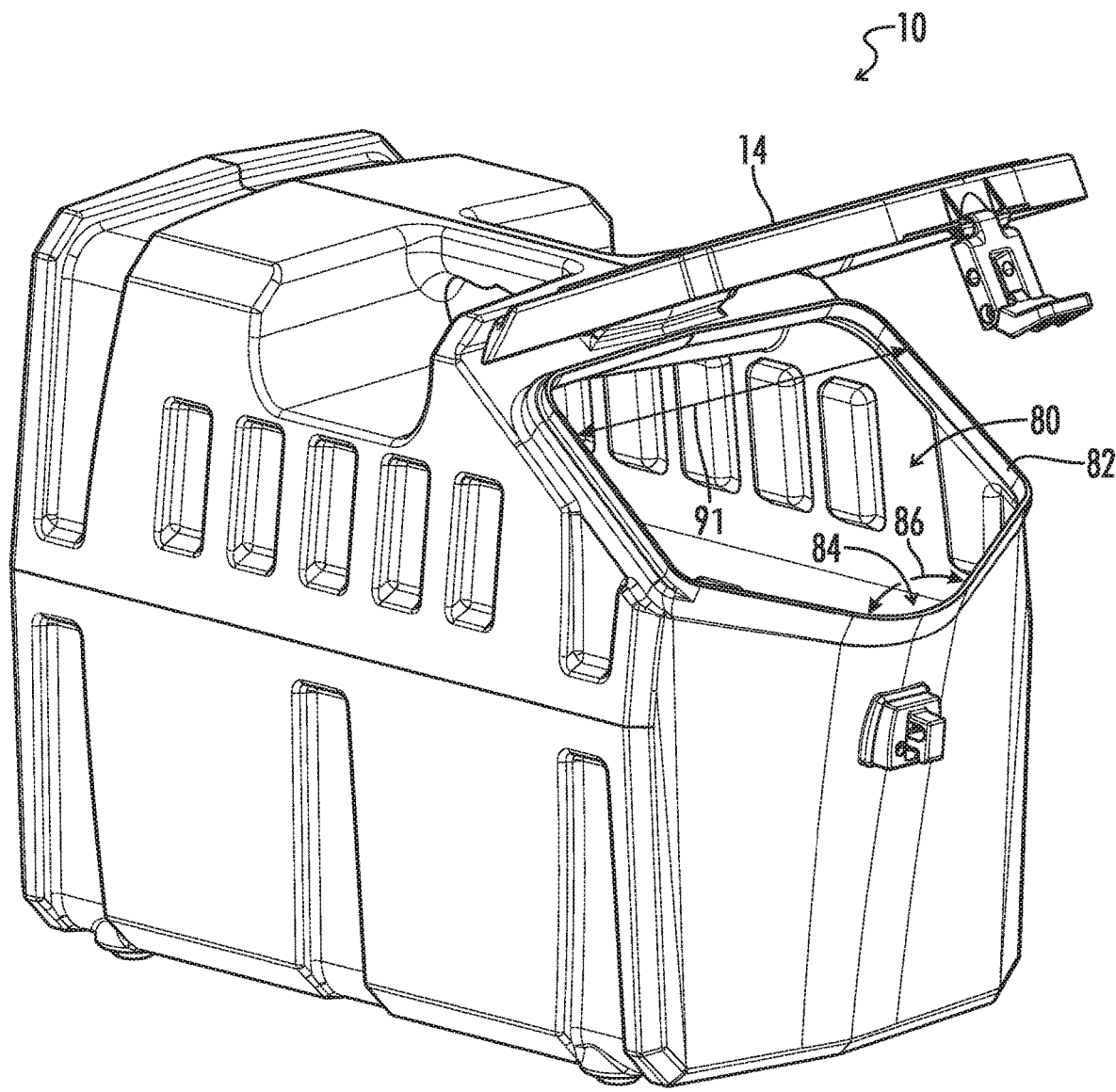
FIG. 16 is a perspective view illustrating one embodiment of a pet food container configured in an open position.
Figure 17:
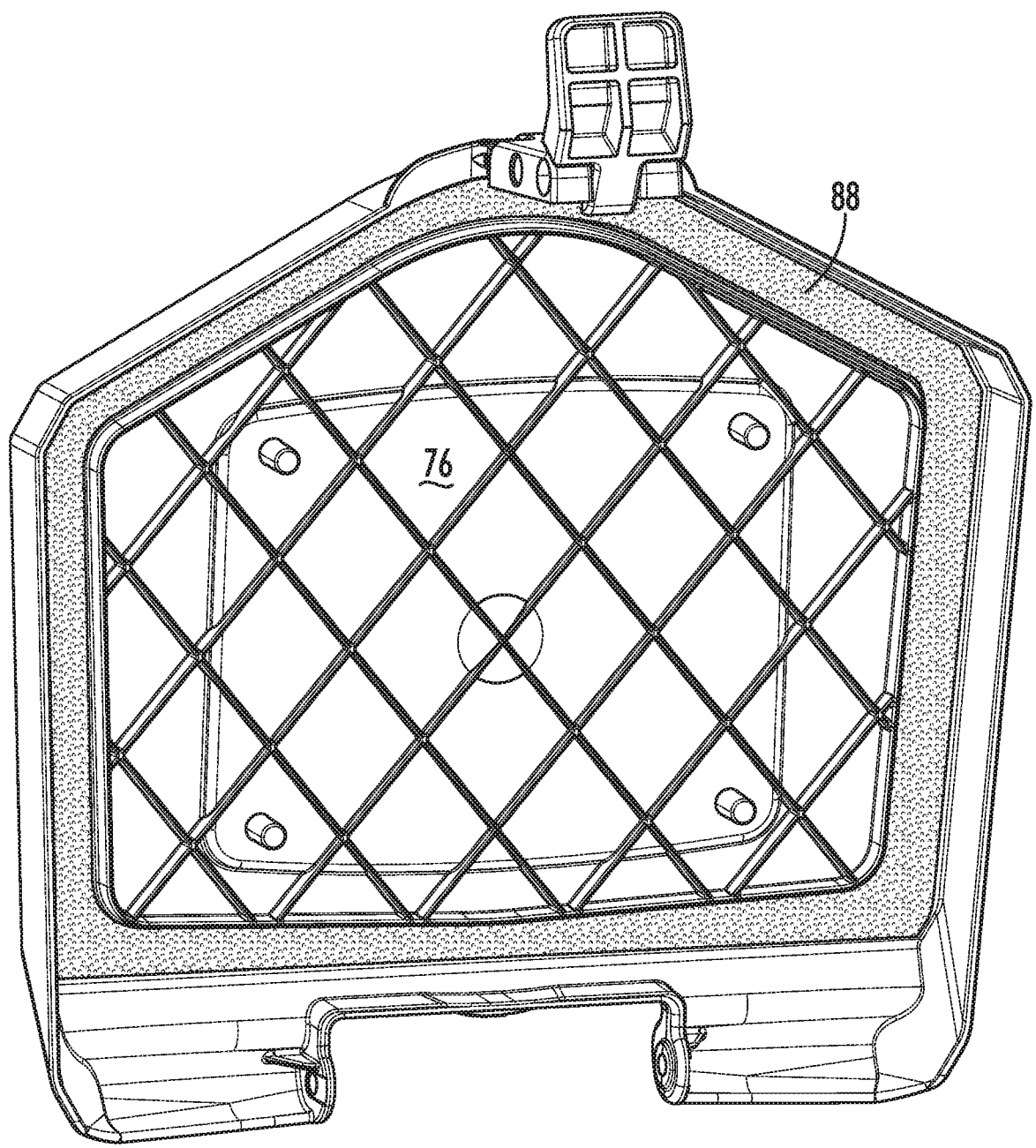
FIG. 17 is a perspective view illustrating one embodiment of a lid of a pet food container.
Figure 18:
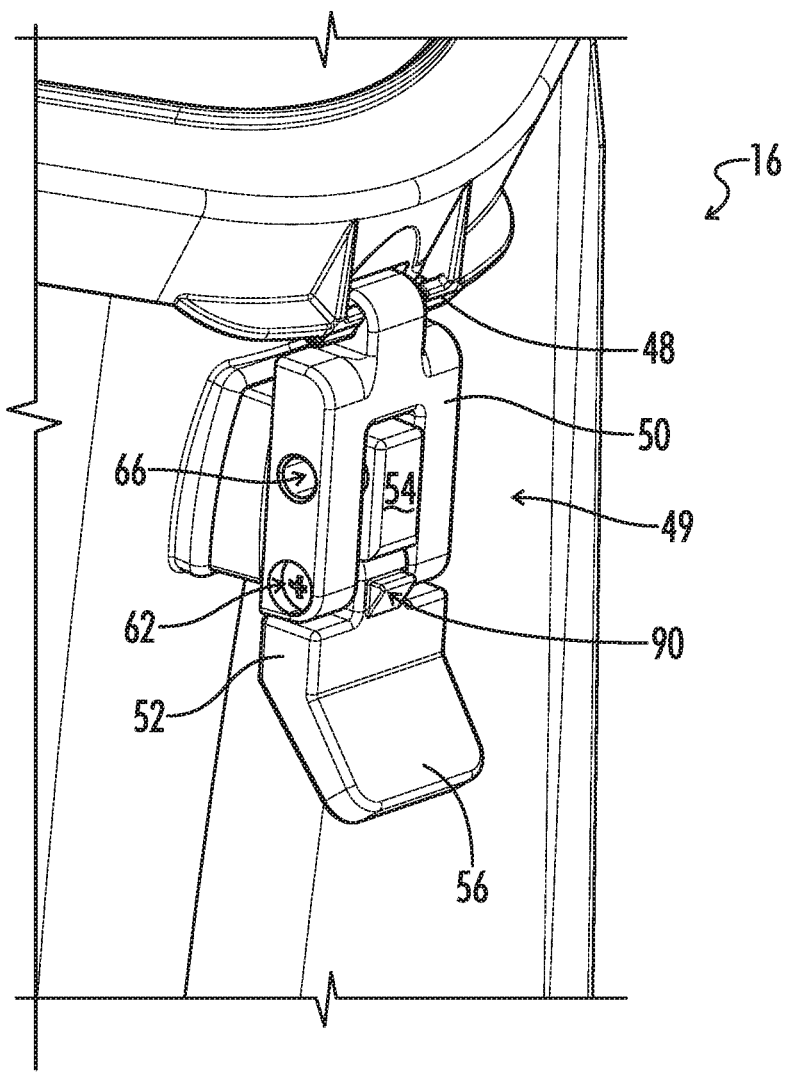
FIG. 18 is a perspective view illustrating one embodiment of a fastener of a pet food container.

Referring further to FIG. 16, in some embodiments, the opening 80 may be configured for accessing the interior space of the container body 12. The opening 80 may be dimensioned (defining a width 91, for example) such that a user may insert a regular-sized dog food bowl into the interior of the container body 12 to scoop out dog food directly into the bowl. In other embodiments, the opening 80 may be dimensioned to accommodate a scoop, cup, or small shovel for removing food.

In one or more embodiments, the container body 12 may include a U-shaped funnel 84 configured to assist with pouring food or water out of the container body 12. For example, the funnel 84 may include an angle 86 less than 180 degrees in some embodiments. In other embodiments, the funnel 84 may include an angle 86 of between about 160 degrees an about 110 degrees. The funnel 84 may define the opening 80.

In certain embodiments, where a user disengages the latch 49 from the container 10 by lifting latch tab 56, the latch clamp 52 may become reengaged with the latch base 54 if the user releases the latch tab 56 before fully lifting the lid 14. To help solve this problem, in some embodiments, a latch clamp kick off 90 can additionally be included.

As depicted in FIGS. 18-21, the latch clamp kick off 90 may be disposed on top of the latch clamp pivot 62 portion of the latch clamp 52. The clamp kick off 90 may be disposed in the same area of the latch 49 as where the latch clamp 52 is pivotally attached to the latch link 50. When opening the fastener 16 by lifting the latch tab 56 portion of the latch clamp 52, the latch clamp kick off 90 may engage with the latch base 54 in a manner that mechanically assists the disengagement of latch clamp 52 from latch base 54. For example, the clamp kick off 90 may engage with the latch base 54 when the lid 14 is in a closed position in order to disengage the latch clamp 52 from the latch base 54. In some embodiments, the latch clamp kick off 90 may help to keep the latch clamp 52 disengaged from the latch base 54 by increasing the distance between the latch cam 68 and the latch base recess 70 when lifting the latch tab 56.

Figure 13:
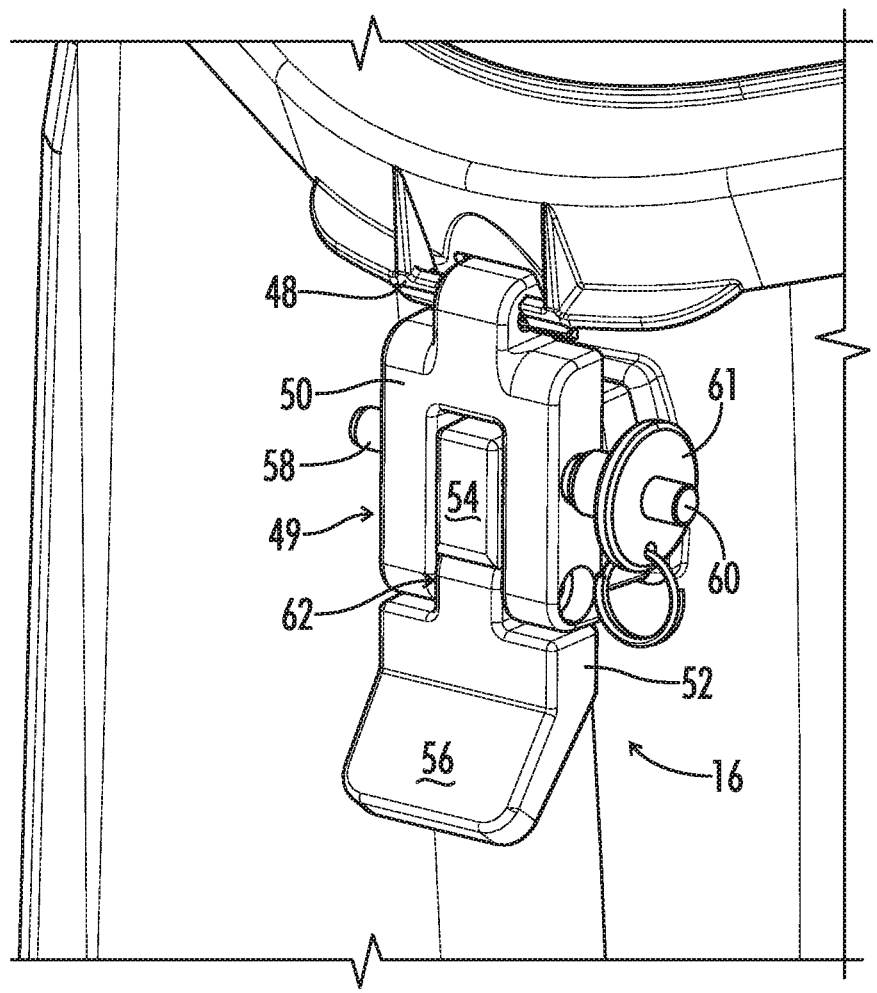
FIG. 13 is a perspective view illustrating one embodiment of a fastener of a pet food container.
Figure 14:
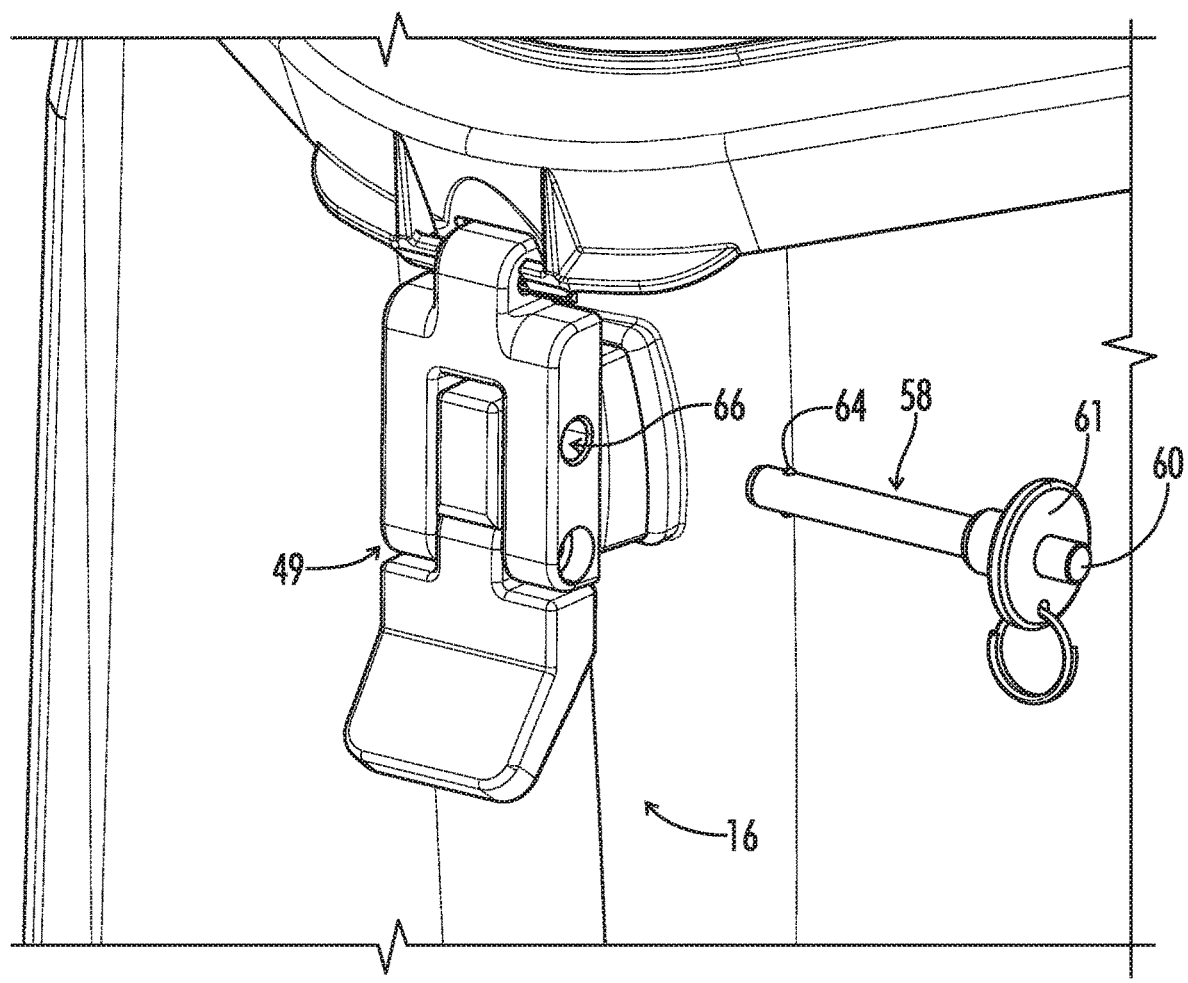
FIG. 14 is a perspective view illustrating one embodiment of a fastener of a pet food container with a lock pin removed from the fastener.
Figure 15:
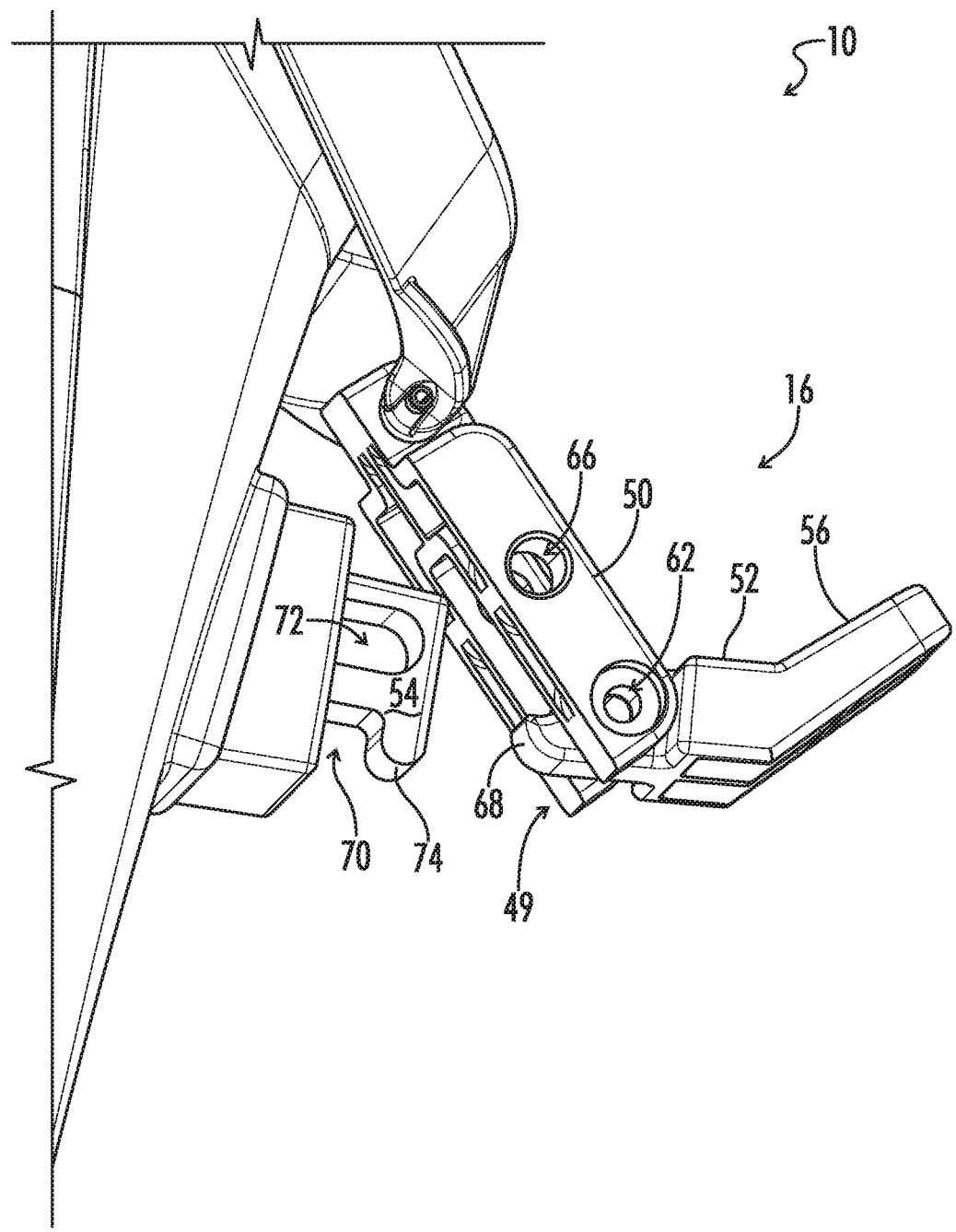
FIG. 15 is a perspective view illustrating one embodiment of a fastener of a pet food container in an open configuration.
Figure 19:
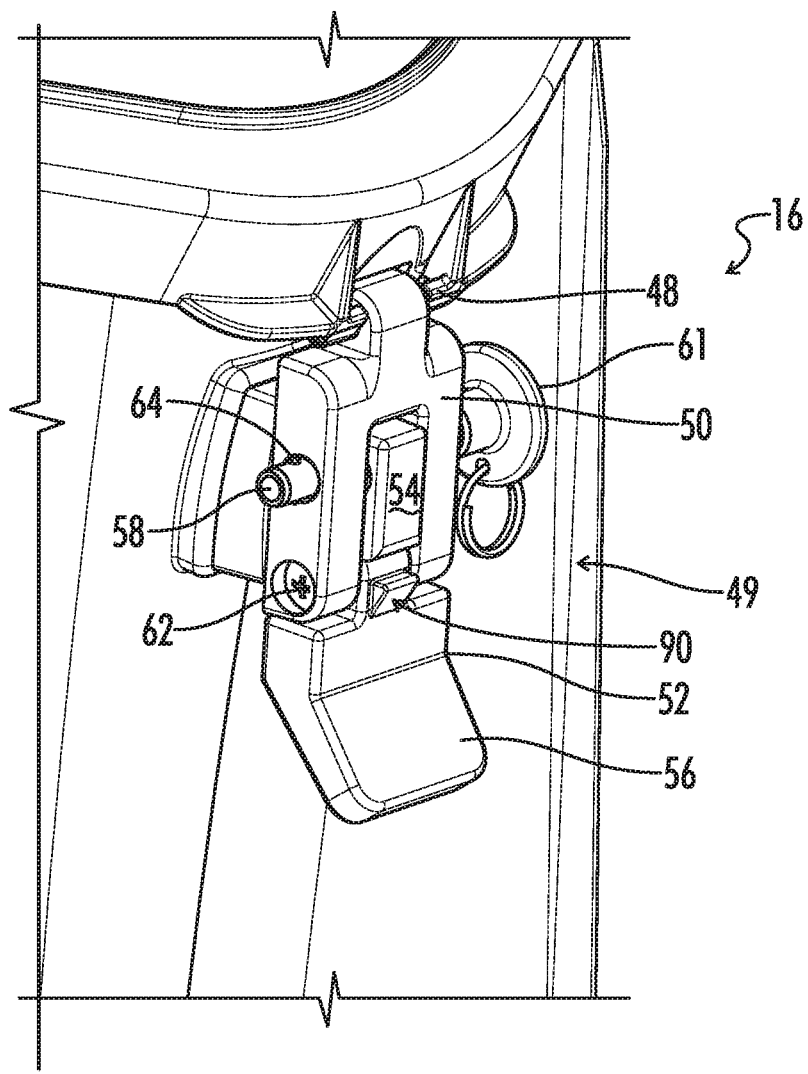
FIG. 19 is a perspective view illustrating one embodiment of a fastener of a pet food container.
Figure 20:
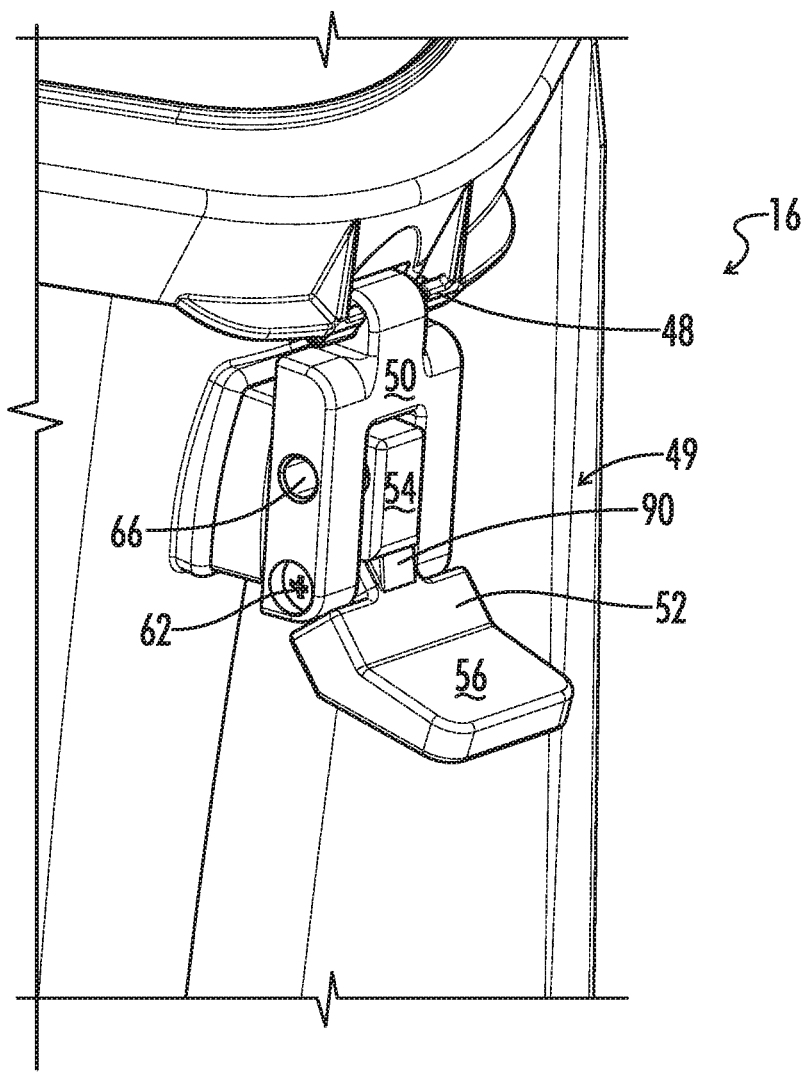
FIG. 20 is a perspective view illustrating one embodiment of a fastener of a pet food container.
Figure 21:
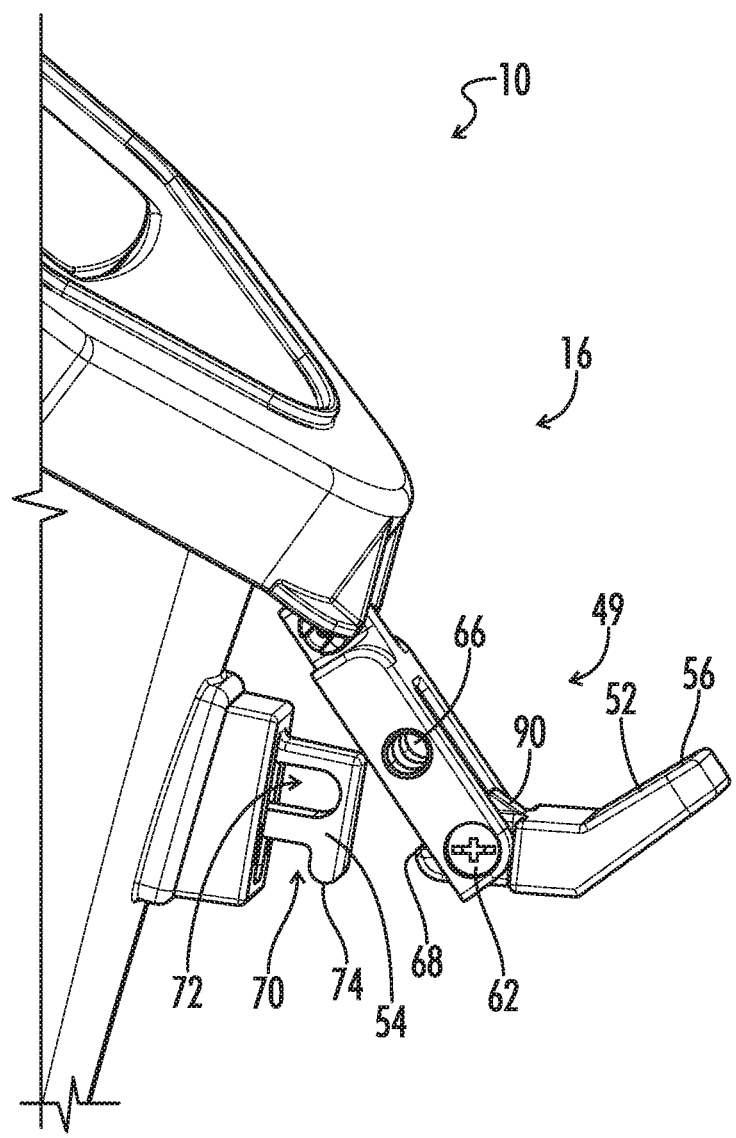
FIG. 21 is a side view illustrating one embodiment of a fastener of a pet food container.

In some embodiments, as depicted in FIG. 13 and FIG. 19, the head 61 of the lock pin 58 of the latch 49 may include an aperture. The aperture may penetrate through the head 61. The aperture may penetrate through the head 61 longitudinally (as depicted in FIGS. 13 and 19) or may penetrate through the head 61 latitudinally. In some embodiments, an object may pass through the aperture of the head 61. For example, as depicted in FIG. 13 and FIG. 19, a ring, such as a keyring, may be inserted through the aperture. The ring may allow the user to hang the lock pin 58 on a hook or attach the lock pin 58 to his or her keyring.

Figure 22:
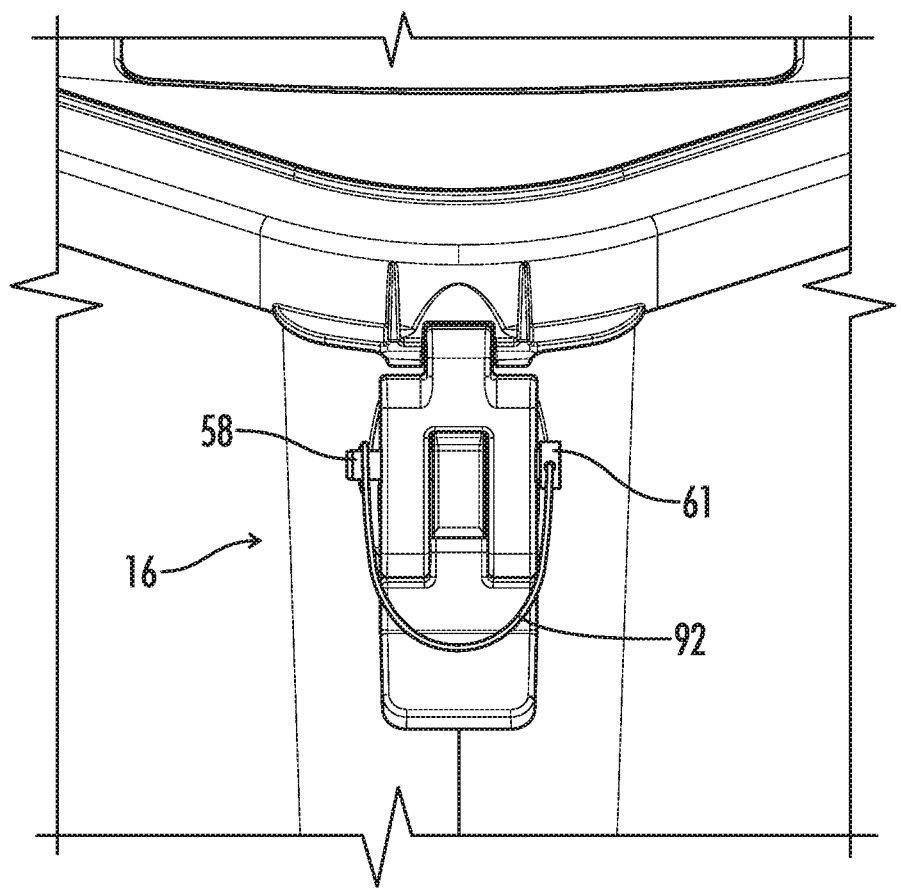
FIG. 22 is a front view illustrating one embodiment of a fastener of a pet food container.

FIG. 22 depicts one embodiment of the fastener 16. The latch 49 may include the lock pin 58 and the head 61 of the lock pin 58. In one embodiment, the lock pin 58 may include a wire 92. The wire 92 may include a loop at a first end. The loop may be disposed within the aperture of the head 61 such that the wire is attached to the head 61. In some embodiments, a second end of the wire 92, which may be distal from the first end, may engage with the distal end of the lock pin 58, as depicted in FIG. 22. The second end of the wire 92 may include a cotter pin, such as a hairpin cotter pin or a linchpin, and may penetrate through an aperture in the distal end of the lock pin 58. In some embodiments, the wire 92 may include a rigid material, and the second end of the wire 92 may include a loop that is disposable around the distal end of the lock pin 58. The wire 92 may secure the lock pin 58 in the lock pin socket 66 and may prevent the lock pin 58 from inadvertently sliding out or disengaging from the fastener 16.

Thus, although there have been described particular embodiments of the present invention of a new and useful PET FOOD CONTAINER, it is not intended that such references be construed as limitations upon the scope of this invention.

What is claimed is:
1. A pet food container apparatus, comprising:
 a container body defining an interior space for storing the pet food;
 an upper handle disposed at a center of a top side of the container body;
 a lid pivotally attached to the container body at a lid hinge, the lid including a latch mount;
 an opening defined in the container body below the lid hinge and above the latch mount, the opening configured for accessing the interior space of the container body;
 a lid rim protruding upwardly from the container body surrounding the opening;
 a gasket disposed on the lid opposite the lid rim; and
 a fastener located below the lid hinge, including:
  a latch disposed on the lid, and
  a latch base disposed on the container body and aligned with the latch, the latch base including a latch base flange protruding downwardly from a front end of the latch base and a latch base recess formed between the latch base flange and the container body,
 wherein the latch includes:
  a latch link pivotally attached to the latch mount; and
  a latch clamp pivotally attached to the latch link, the latch clamp having a latch cam that engages the latch base flange and is disposed in the latch base recess when the lid is in a closed position, and a latch tab that protrudes from the latch cam away from the container body and the latch base when the lid is in the closed position, and
 wherein the lid rim engages the gasket in a continuous ring-shaped seal when the latch engages the latch base and the lid is in a closed position.

2. The apparatus of claim 1, further comprising a lock pin disposed on the latch, wherein:
 the lock pin is selectively removable from the latch;
 the latch further includes a latch pin socket;
 the latch base further includes a lock socket; and
 the lock pin is selectively disposable in the latch pin socket and the lock socket when the lid is in the closed position.

3. The apparatus of claim 1, wherein the lid hinge comprises a friction hinge.

4. The apparatus of claim 1, further comprising a plurality of rubber feet disposed on a bottom of the container body.

5. The apparatus of claim 1, wherein a curved lower edge of the opening defines a U-shaped funnel.

6. The apparatus of claim 1, further comprising a pour handle defined on a lower edge of a back side of the container body, wherein the fastener is positioned on a front side of the container body.

7. The apparatus of claim 1, wherein the lid includes a name plate recess.

8. A pet food container apparatus, comprising:
a container body defining an interior space for storing the pet food;
a lid pivotally attached to the container body at a lid hinge;
an opening defined in the container body below the lid hinge and configured for accessing the interior space of the container body;
a lid rim shaped in the form of an upright wall protruding upwardly from the container body and surrounding the opening;
a gasket disposed on an inside of the lid opposite the lid rim; and
a fastener located below the lid hinge, including:
a latch disposed on the lid, and
a latch base disposed on the container body and aligned with the latch,
wherein a curved lower edge of the opening defines a U-shaped funnel that forms an angle of less than one-hundred and eighty degrees,
wherein the lid includes a lid edge extending downward from an outer perimeter of the lid, and
wherein the lid edge is disposed around the upright wall when the lid is in a closed position, such that the lid edge is disposed outside of the lid rim and the lid rim engages the gasket on an underside of the lid in a continuous ring-shaped seal when the latch engages the latch base and the lid is in a closed position.

9. The apparatus of claim 8, wherein the latch further comprises a latch cam disposed on the latch, wherein the latch cam engages the latch base when the lid is in the closed position.

10. The apparatus of claim 9, wherein:
the latch base further includes
a latch base flange protruding downward from a front edge of the latch base, and
a latch base recess defined by the latch base flange; and
the latch cam engaging the latch base includes the latch cam being disposed in the latch base recess when the lid is in the closed position.

11. The apparatus of claim 8, wherein the lid comprises a name plate recess.

12. The apparatus of claim 8, further comprising an upper handle disposed on a top side of the container body,
wherein the upper handle is located at a center of the top side of the container body, and
wherein a handle recess is defined between the upper handle and the container body, the handle recess extending between a left side of the container body and a right side of the container body.

13. The apparatus of claim 8, further comprising a pour handle defined on a lower edge of a back side of the container body, wherein the fastener is positioned on a front side of the container body.

14. The apparatus of claim 8, wherein the angle is between about one-hundred and ten degrees and about one-hundred and sixty degrees.

15. A pet food container apparatus, comprising:
a container body defining an interior space for storing the pet food;
a plurality of rubber feet disposed on a bottom side of the container body;
a lid pivotally attached to the container body at a lid hinge;
an opening defined in the container body below the lid hinge and configured for accessing the interior space of the container body;
a lid rim protruding upwardly from the container body surrounding the opening;
a gasket disposed on the lid opposite the lid rim;
an upper handle disposed on a top side of the container body,
wherein the upper handle is located at a center of the top side of the container body, and
wherein a handle recess is defined between the upper handle and the container body, the handle recess extending between a left side of the container body and a right side of the container body;
a fastener located below the lid hinge and positioned on a front side of the container body, including:
a latch disposed on the lid, and
a latch base disposed on the container body and aligned with the latch; and
a pour handle defined on a lower edge of a back side of the container body, the pour handle forming a pour handle recess that extends from the back side of the container body to the bottom side of the container body,
wherein the lid rim engages the gasket in a continuous ring-shaped seal when the latch engages the latch base and the lid is in a closed position, and
wherein the container body is made of a molded polymer material as a single piece.

16. The apparatus of claim 15, wherein:
the latch includes a latch link pivotally attached to the lid;
the latch further includes a latch clamp pivotally attached to the latch link;
the fastener further includes a lock pin selectively removable from the latch and the latch base;
the lock pin further includes a first end and a second end disposed distal from the first end;
the lock pin further includes a wire, wherein the wire includes a first end and a second end distal from the first end of the wire;
the first end of the wire is disposed on the first end of the lock pin; and
the second end of the wire is selectively engageable with the second end of the lock pin.

17. The apparatus of claim 15, wherein a lower edge of the opening defines a U-shaped funnel forms an angle of less than one-hundred and eighty degrees.

18. The apparatus of claim 15, wherein the lid hinge comprises a friction hinge.

19. The apparatus of claim 15, wherein the lid includes a name plate recess.

* * * * *